(12) United States Patent
Kraus et al.

(10) Patent No.: US 8,251,089 B1
(45) Date of Patent: Aug. 28, 2012

(54) RELIEF SYSTEM FOR PROCESS FLUIDS UNDER PRESSURE

(75) Inventors: Kurt E. Kraus, Tulsa, OK (US); Bryan L. Beck, Jenks, OK (US); Dusty R. Richmond, Cleveland, OK (US)

(73) Assignee: Honeywell International Inc., Morristown, NJ (US)

( * ) Notice: Subject to any disclaimer, the term of this patent is extended or adjusted under 35 U.S.C. 154(b) by 652 days.

(21) Appl. No.: 11/935,853

(22) Filed: Nov. 6, 2007

(51) Int. Cl.
*G05D 7/01* (2006.01)

(52) U.S. Cl. .. 137/467; 137/70; 137/492.5; 137/601.13; 251/26

(58) Field of Classification Search .................. 137/70, 137/467, 488, 492.5, 601.01, 601.13, 110, 137/599.01; 251/26, 67, 73
See application file for complete search history.

(56) References Cited

U.S. PATENT DOCUMENTS

| | | | | |
|---|---|---|---|---|
| 2,082,940 A * | 6/1937 | Brisbane et al. | | 137/488 |
| 2,296,568 A * | 9/1942 | Peacock | | 137/488 |
| 2,661,023 A * | 12/1953 | Griswold | | 251/26 |
| 2,825,306 A * | 3/1958 | Buri | | 251/26 |
| 3,222,259 A * | 12/1965 | Wall, Jr. | | 137/251.1 |
| 3,865,132 A * | 2/1975 | Wiegand | | 137/492.5 |
| 4,000,754 A * | 1/1977 | Risk | | 137/492.5 |
| 5,012,834 A * | 5/1991 | Taylor | | 137/70 |
| 5,297,575 A * | 3/1994 | Taylor | | 137/70 |
| 5,433,239 A * | 7/1995 | Taylor | | 137/69 |
| 5,480,475 A | 1/1996 | Tuttle | | |
| 5,575,306 A * | 11/1996 | Taylor | | 137/70 |
| 5,797,332 A | 8/1998 | Keller et al. | | |
| 5,860,442 A * | 1/1999 | Taylor | | 137/68.11 |
| 6,155,284 A | 12/2000 | Scantlin | | |
| 6,325,088 B1 | 12/2001 | Scantlin | | |
| 6,651,686 B2 * | 11/2003 | Scantlin et al. | | 137/70 |
| 6,651,687 B2 * | 11/2003 | Taylor | | 137/70 |
| 6,659,119 B2 * | 12/2003 | Taylor | | 137/70 |
| 6,666,230 B1 * | 12/2003 | Taylor | | 137/70 |
| 6,843,265 B2 * | 1/2005 | Taylor | | 137/70 |
| 6,875,008 B1 | 4/2005 | Martin et al. | | |
| 6,880,568 B1 * | 4/2005 | Taylor | | 137/488 |

* cited by examiner

*Primary Examiner* — John Rivell
(74) *Attorney, Agent, or Firm* — Head Johnson & Kachigian P.C.

(57) ABSTRACT

A relief system for process fluids under pressure. The system includes a normally open isolation valve in fluid communication with a process system under pressure through an upstream conduit. A buckling pin actuator is in fluid communication with the upstream conduit through a sensing line. A spring activated actuator is engaged with the isolation relief valve in order to retain the isolation valve in a closed position. A buckling actuator bypass valve is supplied with non process fluid pressure to an input port and the buckling actuator bypass valve also includes a first output port to the spring activated actuator and a second output port to a vent whereby pressure in the process system above a predetermined level will actuate the buckling pin actuator, moving said buckling actuator bypass valve to said second outlet port to vent and thereby moving the spring activated actuator in order to open the isolation valve.

8 Claims, 7 Drawing Sheets

RELIEF SYSTEM FOR PROCESS FLUIDS UNDER PRESSURE

BACKGROUND OF THE INVENTION

1. Field of the Invention

The present invention is directed to a relief system for process fluids under pressure utilizing a pressure fused valve or pressure fused valve actuator to open a relief valve at a predetermined relief pressure. In particular, the present invention is directed to a relief system for process fluids under pressure utilizing a small, pilot pressure activated valve actuator.

2. Prior Art

Many industrial processes incorporate pressurized containers, such as tanks or vessels, and piping to process fluids. Examples of such industrial processes include natural gas processing, oil refining, and chemical manufacturing. Examples of component equipment include pressure vessels, drums, tanks, pumps, compressors, blowers, and distillation columns. These industrial processes are required to operate within acceptable pressure ranges. Changes in temperature, equipment status, and power conditions, among others, may cause the pressure in the containers or in the process to rise. By way of example, a closed process outlet or a plant fire might result in an over pressure condition.

While it is possible to design tanks and other parts of the industrial process to withstand extremely high pressures, it is also important to have pressure relief systems in place that may be opened to divert the fluids in the event of pressure over the predetermined level. In addition, government regulations and industry codes may require protection against over pressure. For example, see U.S. Code of Federal Regulations, 29 CFR §1910.119 on Process Safety Management.

While it is possible to monitor an industrial process and manually open relief valves in the event of an over-pressure condition, it is also important to have a system in place so that valves will automatically open, thereby diverting fluid and reducing the pressure.

In some industrial processes, such as natural gas processing or oil refining, in the event that a relief condition is determined, a valve or valves will be opened and the excess hydrocarbons will be directed to flares so that the process fluids will not be released directly to the atmosphere.

Various types of relief valves are used to control or limit the pressure in a system or vessel. The relief valve may be designed or set to open at a predetermined pressure in order to protect the vessels and other equipment. When the predetermined pressure is exceeded, the relief valve will be forced open and fluid will be diverted through an auxiliary route. As the fluid is diverted, the pressure inside the vessel or tank will drop. Once it reaches the resetting pressure, the valve will be reset or re-closed.

In order to quickly and safely reduce the pressure in the system, high flow capacity may be required to quickly reduce pressure upon opening of the relief valve. One type of relief valve incorporates a buckling pin. In the event that a buckling pin relief valve is used as the relief valve, the throughput capacity is limited by the physical dimensions of the moving end of the buckling pin valve upon buckling pin failure.

Accordingly, it would be desirable to provide a relief valve system that could utilize a small fused actuator while permitting adequate fluid flow in the event of an emergency or in the event of controlled relief.

Moreover, existing buckling pin valve designs are difficult to test while the system is under pressure on line. Testing of the existing buckling pin valve designs requires either taking a portion of the system off service which reduces the system capacity or the addition of rather large and expensive isolation valves. Accordingly, it would be desirable to provide a buckling actuator valve design that would be simple to test without taking a portion of the system off service.

It would also be desirable to provide a relief valve system that could be operated automatically in the event that the system exceeded a predetermined pressure or alternatively might be manually or electronically opened with an actuator.

It would also be desirable to provide a relief valve system that utilizes readily available components without expensive custom components.

SUMMARY OF THE INVENTION

The present invention is directed to a relief system for a process system under pressure. The process system is in fluid communication with a normally open isolation valve through an upstream conduit. The relief valve is maintained in a closed position during normal operation.

When the relief valve is moved to an open position, for example, by action of the spring activated actuator, fluids in the process system and the upstream conduit are allowed to pass to a downstream conduit where the fluid may be released to the atmosphere or, alternatively, burned in a flare.

A pressure fused actuator is in fluid communication with the upstream conduit through a pilot or slip stream or sensing line. The pressure in the sensing line will reflect that in the upstream conduit and in the process system in general. The pressure fused actuator is retained in a fused position and will be set or configured to trip at a predetermined pressure level.

In one preferred embodiment, a buckling pin actuator is engaged with a buckling actuator bypass valve. In one configuration, the buckling actuator bypass valve has an input port supplied with a non process fluid under pressure. A first output port is in fluid communication with an output line and a second output port is in fluid communication with a vent. The buckling actuator operates to move the actuator bypass valve between the vent position and the activated position.

The line for the activated position is in fluid communication and operates as an input to an actuator bypass valve. The non process fluid supply is thereby directed to the actuator bypass valve through its input port. The actuator bypass valve also has a first output port in fluid communication with the spring activated actuator and a second output port in fluid communication to a vent. The non process fluid pressure through the actuator bypass valve is greater than the force of the spring and forces the spring activated actuator to retain the isolation valve in a closed position.

The actuator bypass valve may move from the normal operational position to a vent position either manually or through an actuator, such as a solenoid.

If the pressure in the process system in the upstream conduit exceeds a predetermined level, pressure in the sensing line will likewise exceed a predetermined level. Accordingly, the buckling pin and the buckling pin actuator will trip or buckle, thereby causing movement of the buckling actuator bypass valve to the vent position, thereby reducing input pressure to the actuator bypass valve and, thereby, the spring activated actuator. Accordingly, the force of the spring will overcome the force provided by pressure from the non process fluid and the relief valve will move to an open position.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
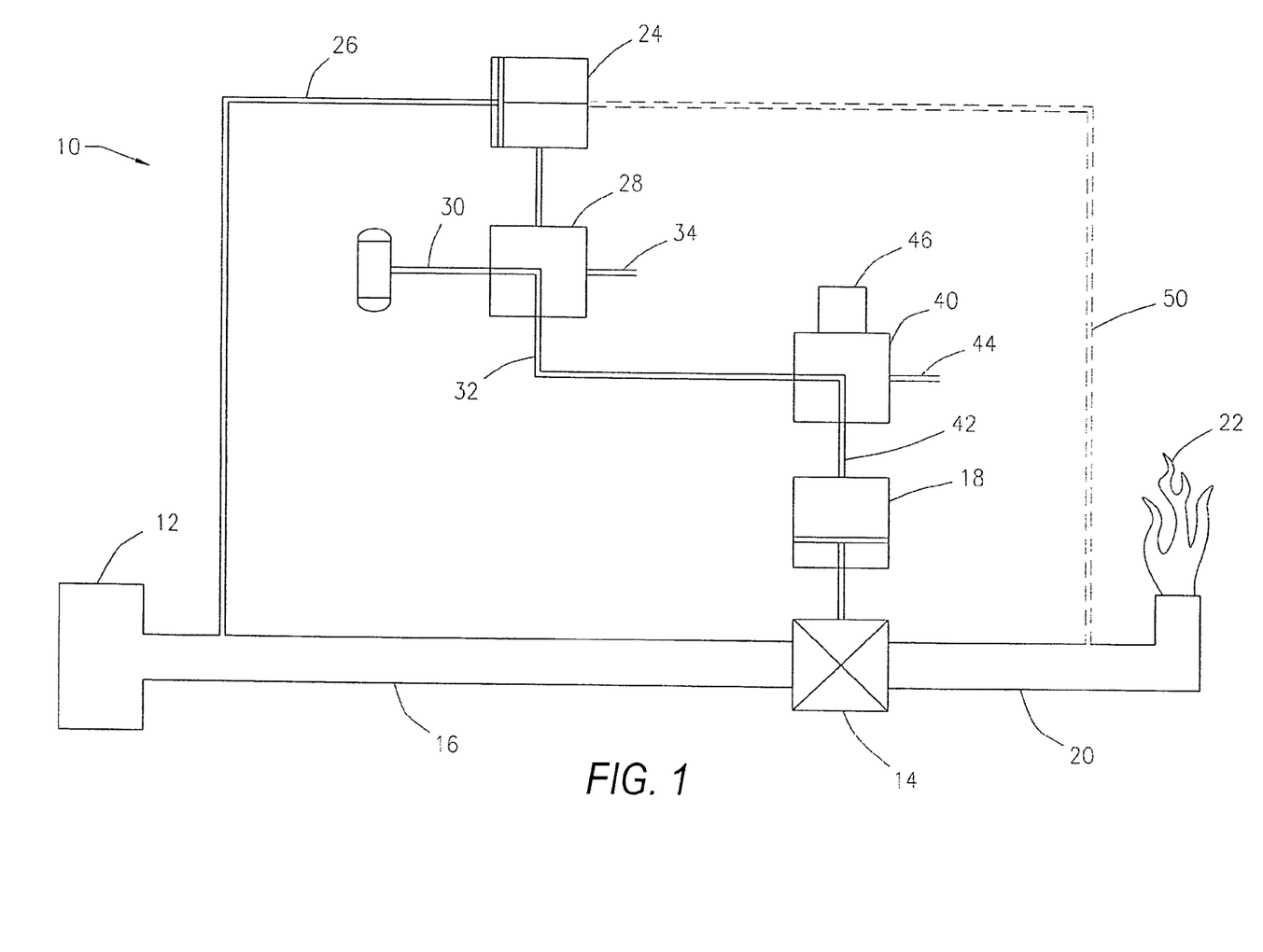
FIGS. 1, 2 and 3 show diagrammatic views of a first preferred embodiment of a relief system for process fluids under pressure in accordance with the present invention.
Figure 2:
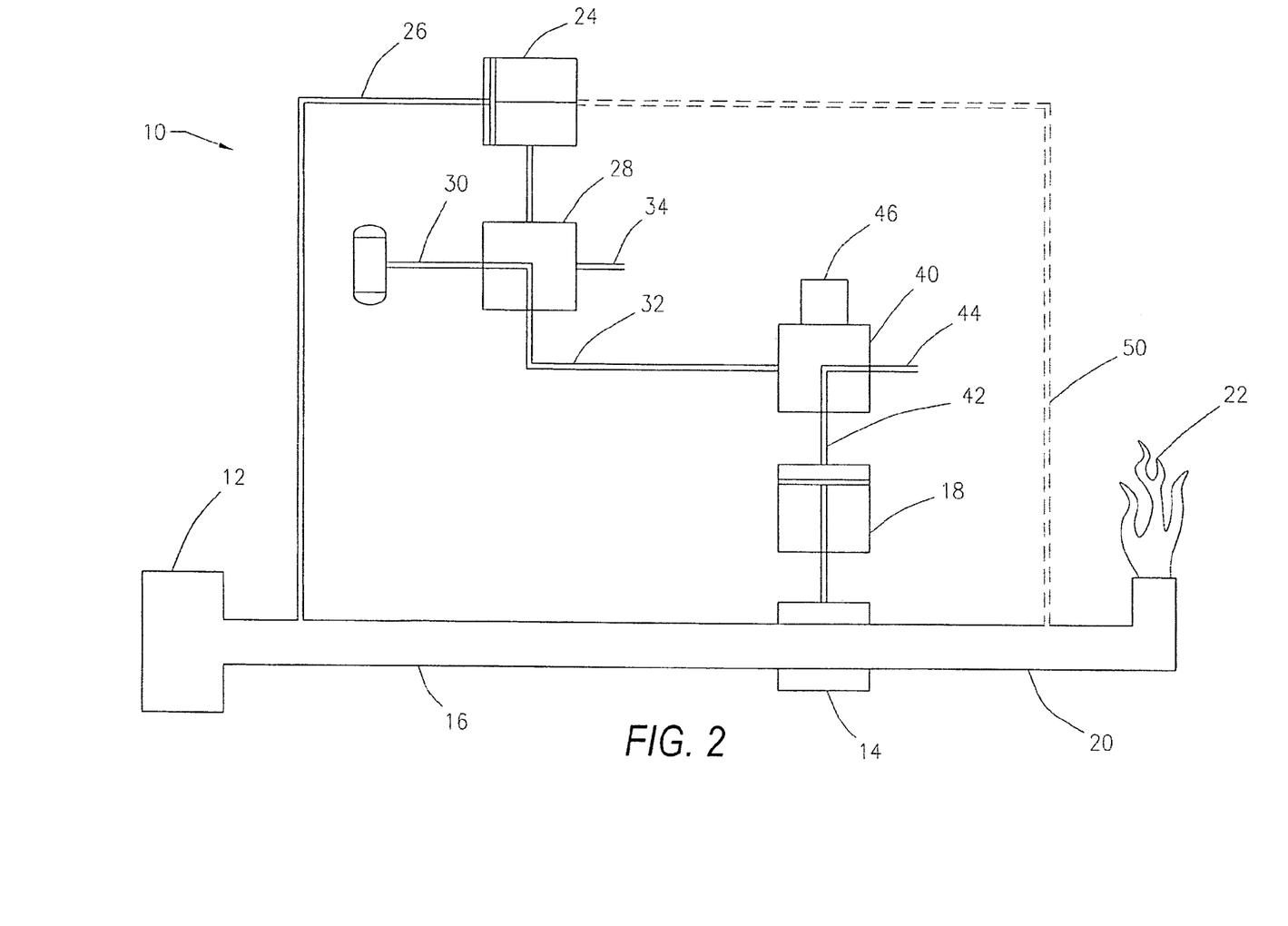
Figure 3:
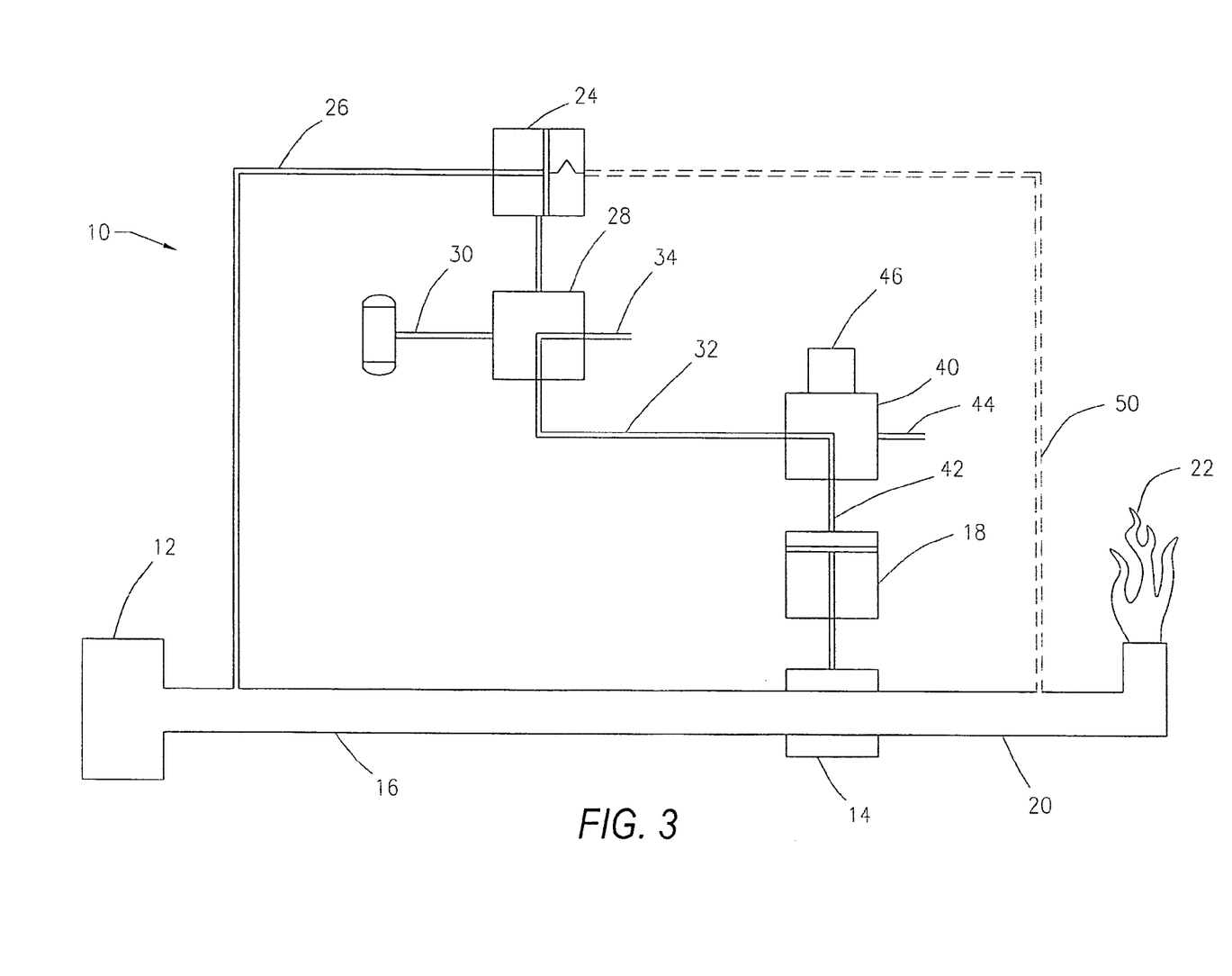

Referring to the drawings in detail, FIGS. 1, 2 and 3 illustrate a diagrammatic view of a first preferred embodiment of a relief system 10 for process fluids under pressure. The present invention provides a relief system for a process system 12 which may include one or more elements including, but not limited to, vessels, tanks, containers, and piping. In one non-limiting example, a process system may normally operate at a pressure of between 100 and 200 pounds per square inch (psi).

The relief system 10 is shown in a standby configuration in FIG. 1. The process system 12 is in fluid communication with a normally open isolation valve 14 through an upstream conduit 16. The relief valve 14 may take many configurations and may be moved between a closed position and an open position. The process system 10 normally operates with the relief valve 14 maintained in a closed position by action of spring activated actuator 18.

When the relief valve 14 is moved to an open position by action of the spring, fluids in the process system 12 and the upstream conduit 16 are allowed to pass to a downstream conduit 20 where the fluid may be released to the atmosphere or burned in a flare 22. When the relief valve 14 is open, fluids will exit the process system 12, thereby reducing the pressure therein. The relief valve 14 will be sized to safely and quickly discharge fluid to reduce the pressure.

A buckling pin actuator 24 is in fluid communication with the upstream conduit through a pilot or slip stream or sensing line 26. The pressure in the sensing line 26 will reflect that in the upstream conduit 16 and in the process system 12, in general.

While a buckling pin actuator 24 is used in the preferred embodiment, other types of pressure fused actuators may alternately be employed. The buckling pin actuator 24 is retained in a fused condition and will be set or configured to buckle or trip at a predetermined pressure level. For example, if the fluid in the process system 12 is between 100 and 200 psi, the buckling pin actuator 24 may be set to trip at 300 psi. As the process fluids are not discharged through the buckling pin actuator 24, it does not have to be sized large enough to handle fluid flow.

The buckling pin actuator 24 is engaged with a buckling actuator bypass valve 28. In a preferred embodiment, the buckling actuator bypass valve 28 is a three-way bypass valve having three ports with flow coming in at one port which can be directed to either a first output port or a second output port. The input port of the bypass valve 28 is supplied with a non process fluid under pressure. Non limiting examples of the non process fluid would be pressurized atmospheric air, nitrogen gas or even hydraulic fluid. A non process fluid is shown by line 30. A first output port is in fluid communication with output line 32 which, as will be discussed in detail, is in communication with the spring activated actuator 18. A second output port is in fluid communication with a vent shown by line 34. As will be described below, the buckling pin actuator 24 operates to move the buckling actuator bypass valve 28 between the vent position and the activated position.

The output line 32 is in fluid communication and operates as the input to an actuator bypass valve 40. In a preferred embodiment, the actuator bypass valve 40 is a three-way bypass valve having three ports. Accordingly, the non process fluid supply is directed to the actuator bypass valve 40 through its input port. The actuator bypass valve 40 also has a first output port in communication with the spring activated actuator 18 through line 42 and a second output port to a vent illustrated by line 44. The actuator bypass valve 40 may, thus, be moved to direct the non process fluid between the vent position with the second output port and the active position through the first output port. The non process fluid pressure to the first output port is greater than the force of the spring and forces the spring activated actuator 18 to retain the isolation valve 14 in a closed position.

The actuator bypass valve 40 may be moved from the normal operational position to a vent position either manually or through use of a solenoid actuator (illustrated by box 46). While an electromechanical actuator, such as a solenoid, may be utilized, other types of actuators, such as manual actuators, electric motor actuators, pneumatic actuators, or other actuators may be employed within the spirit and scope of the invention.

The downstream conduit 20 may optionally include a differential pressure sensing line 50 (dashed lines) which extends back to the buckling actuator 24 and is capable of sensing back pressure in the system 10. The optional differential pressure sensing line 50 might be employed in situations where there is high pressure in the downstream conduit 20 from a second system (not shown) or another source. In cases where the actuator bypass valve 40 is vented and where the flow capacity of the relief system (12, 14, 16, 20, 22) is exceeded thereby causing excessive system pressure, differential pressure sensing line 50 will prevent unintended operation of the buckling pin actuator.

FIG. 2 illustrates the relief system 10 shown in FIG. 1 in a normal or mechanical relief arrangement. The solenoid actuator 46 may be operated to move the actuator bypass valve 40 to a relief position so that non process fluid through line 32 to the input port of the actuator bypass valve is blocked from the spring activated actuator 18 and pressurized fluid to the spring activated actuator is vented to vent line 44.

As can be seen, no change in condition of the buckling pin actuator 24 or the buckling actuator bypass valve 28 occurs.

FIG. 3 illustrates the relief system 10 shown in FIGS. 1 and 2 in an emergency relief mode. If the pressure in the process system 12 and the upstream conduit 16 exceeds a predetermined level, the pressure in the sensing line 26 will likewise exceed a predetermined level. Accordingly, the buckling pin in the buckling pin actuator 24 will trip or buckle, thereby causing movement of an actuator. This may be accomplished in a number of ways as are known in the art. For example, the buckling pin actuator 24 may move a piston within the actuator which moves a rack which engages a rotating pinion gear which, in turn, moves the buckling actuator bypass valve 28 from communication between fluid line 30 and the output line 32 to communication between the output line 32 and the vent line 34. Other actuator mechanisms might also be employed. Accordingly, the non process fluid pressure in line 32 is reduced, thereby reducing input pressure to the actuator bypass valve 40 and the first output of the actuator bypass valve 40 and first output line 42 thereby reducing pressure on the spring activated actuator. The force of the spring in the spring activated actuator 18 will overcome the force provided through line 42 and the relief valve 14 will move to an open position. Fluid from the process system 12 will thereby flow through the downstream conduit 20.

In an alternate configuration (not shown), the relief valve 14 would be maintained in a normally open position and driven to a closed position by the non-process fluid.

Figure 4:
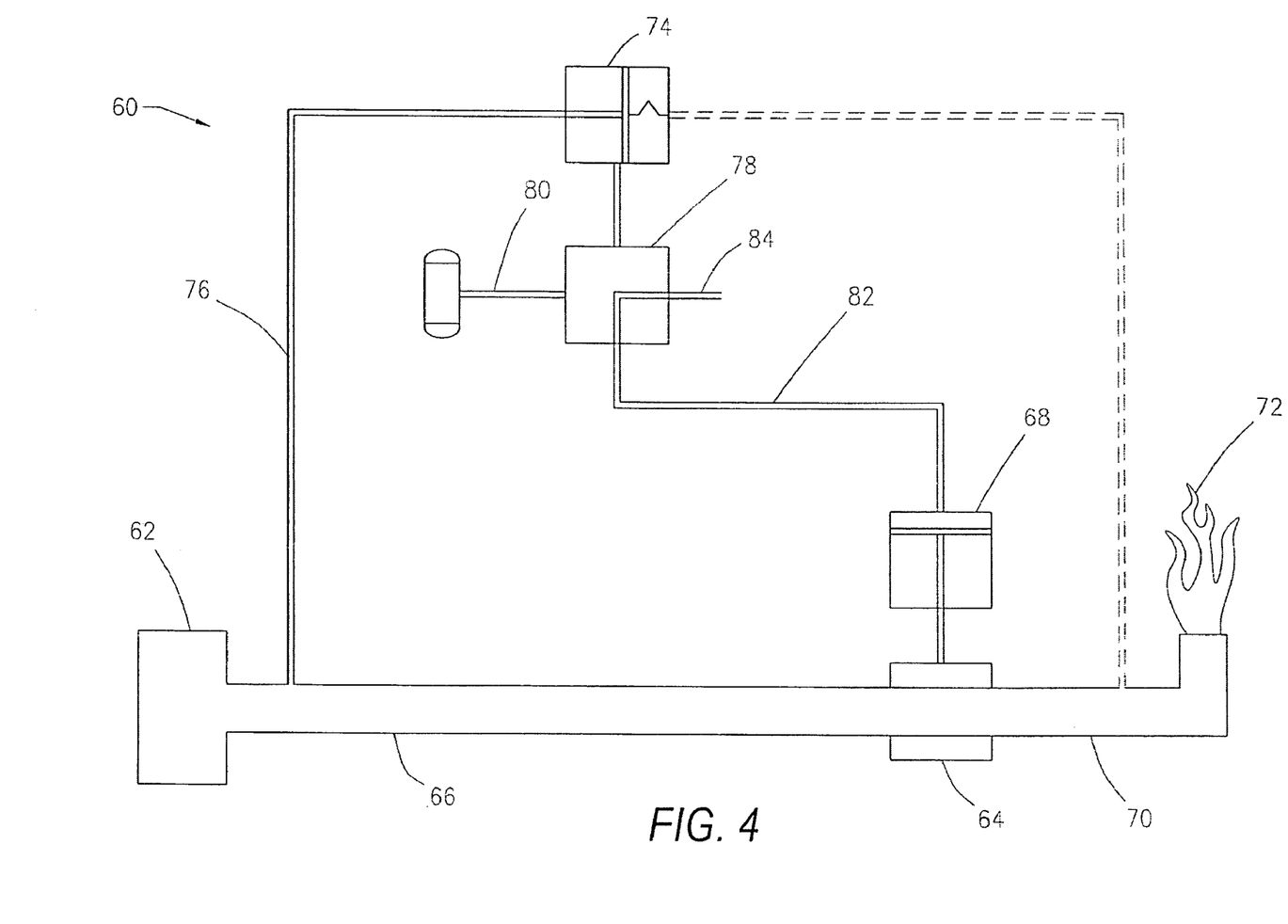
FIG. 4 illustrates a diagrammatic view of a second preferred embodiment of the relief system for process fluids under pressure.

FIG. 4 illustrates a second, preferred embodiment 60 of the present invention showing a relief system in emergency relief mode. A process system 62 is in fluid communication with an isolation relief valve 64 through an upstream conduit 66. The relief valve 64 is normally held in a closed position by a spring activated actuator 68.

When the relief valve 64 is open as shown in FIG. 4, process fluid can pass through the relief valve to a downstream conduit 70 and to an optional flare 72. A buckling pin actuator 74 is in fluid communication with the upstream conduit 66 through a sensing line 76.

The pressure in the sensing line 76 will reflect that in the upstream conduit 66 and in the process system 62, in general.

The buckling pin actuator 74 is engaged with a buckling actuator bypass valve 78. An input port of the buckling actuator bypass valve 78 is supplied with a non process fluid under pressure as shown by line 80. A first output port of the buckling actuator bypass valve 78 is in fluid communication with output line 82 which supplies pressure to the spring activated actuator. A second output port is in fluid communication with a vent 84.

In the event that the fluid pressure in the process system 62 exceeds a predetermined level, the pressure in the sensing line 76 will exceed the predetermined pressure level for the buckling pin actuator 74. Accordingly, the buckling pin actuator 74 will trip, causing the buckling actuator bypass valve 78 to move to the second output position so that non process fluid is vented. Accordingly, fluid pressure in line 82 is reduced, thereby allowing the spring force in the spring activated actuator 68 to open the relief valve 64.

Figure 5:
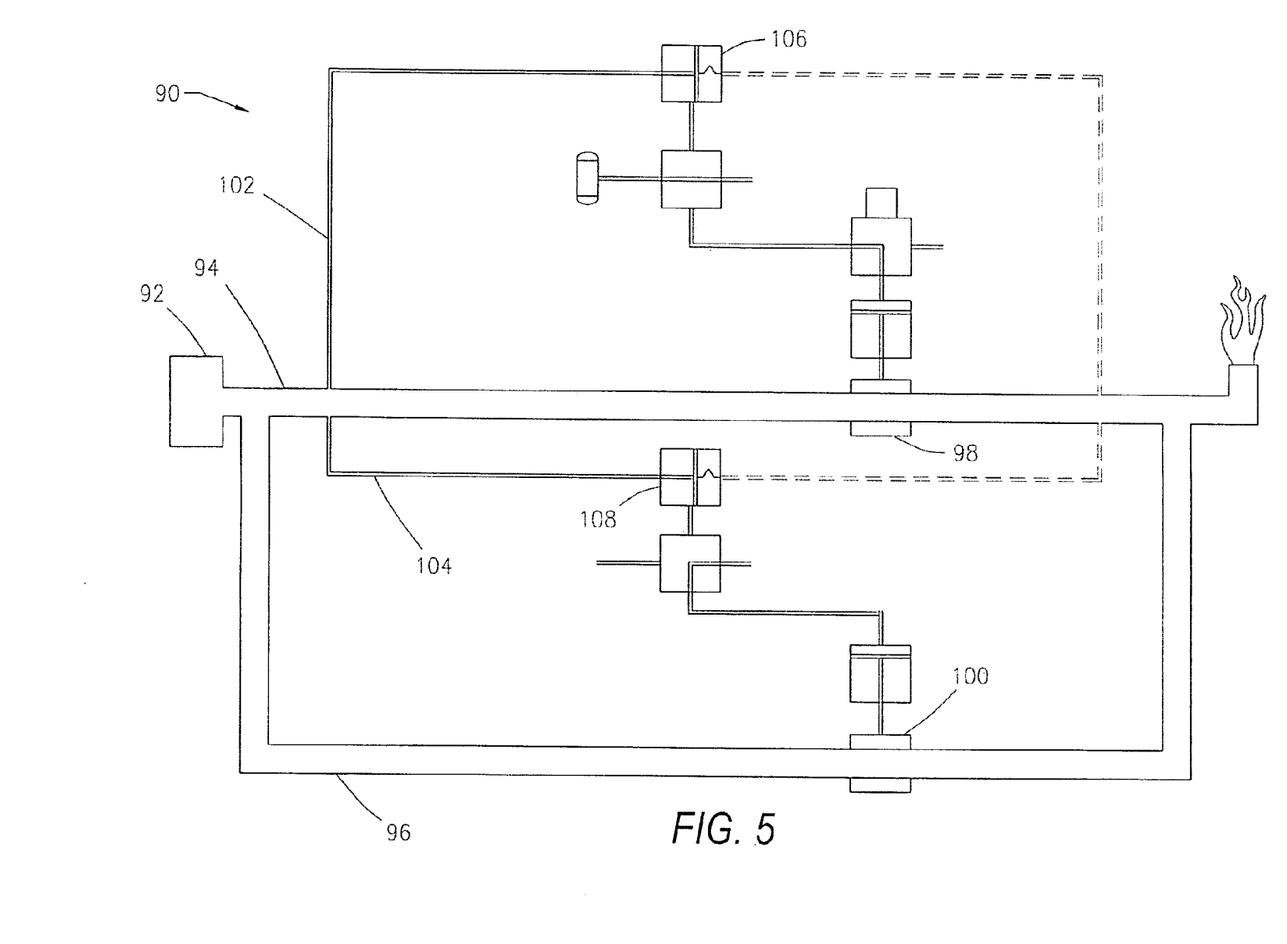
FIG. 5 illustrates a diagrammatic view of a third preferred embodiment of a relief system for process fluids under pressure.

FIG. 5 illustrates a relief system 90 in a third, preferred embodiment of the present invention in emergency relief mode. A process system 92 is in fluid communication with a pair of upstream conduits 94 and 96 which are in parallel with a pair of isolation relief valves 98 and 100, respectively. As previously described, the relief valves may be moved between a closed position and a relief position. Separate sensing lines 102 and 104 operate with a pair of buckling pin actuators 106 and 108, respectively, as previously described.

The upstream conduit and the relief valve 98 include manual or solenoid activation of the relief valve 98 while line 96 and relief valve 100 do not.

Figure 6:
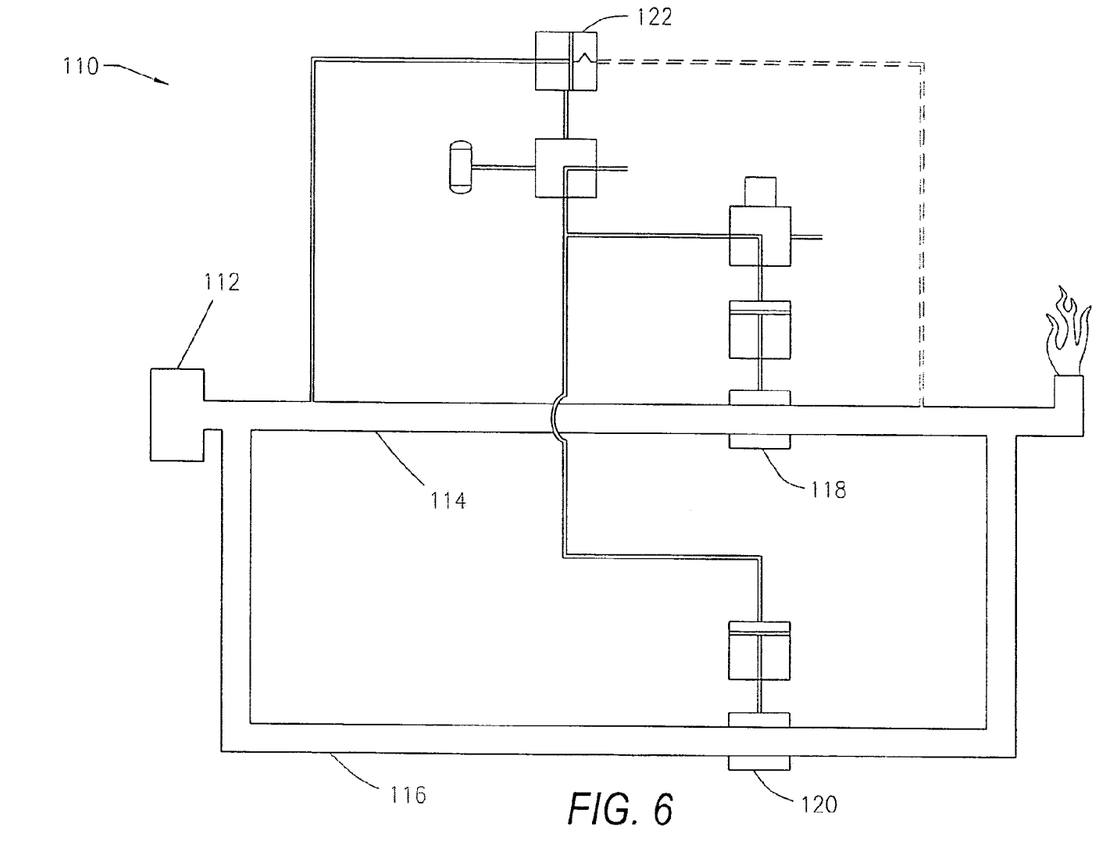
FIG. 6 illustrates a fourth preferred embodiment of a relief system for process fluids under pressure.

FIG. 6 illustrates a further fourth embodiment 110 of a relief system for a process system 112 in emergency relief mode having a pair of upstream conduits 114 and 116 in parallel operating with a pair of relief valves 118 and 120, respectively, which are opened by a single buckling pin actuator 122. Line 114 and relief valve 118 can be manually or automatically controlled whereas line 116 and relief valve 120 can not.

Figure 7:
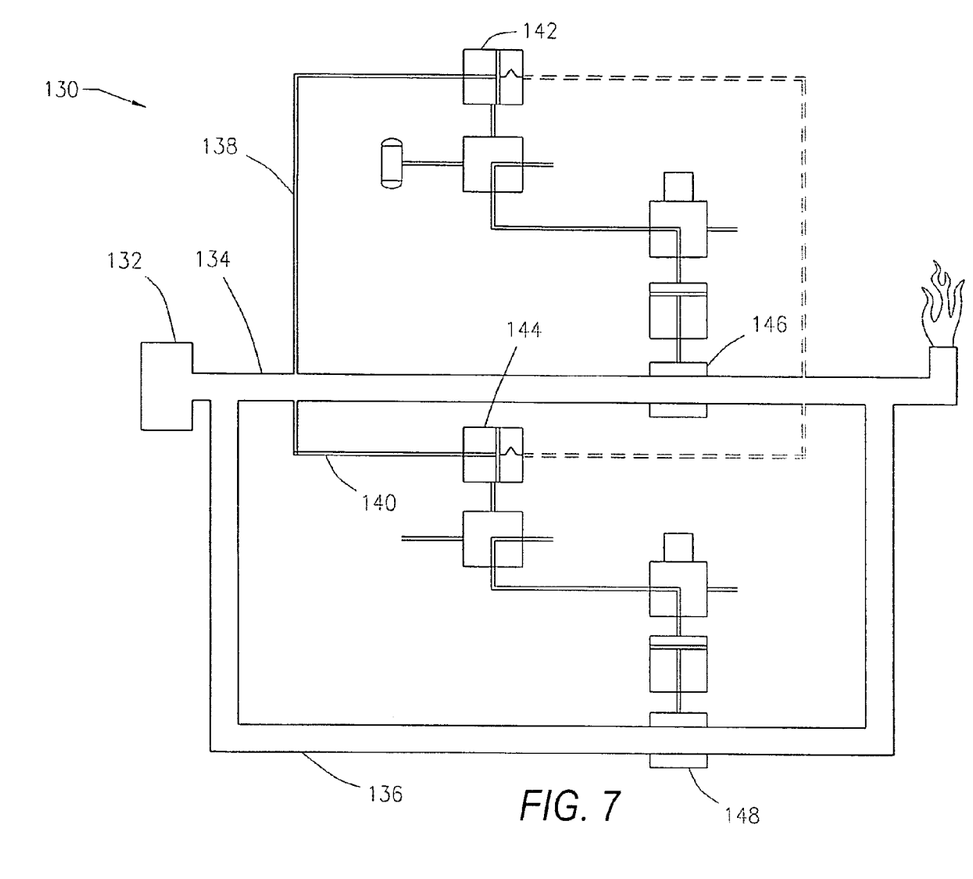
FIG. 7 illustrates a fifth preferred embodiment of a relief system for process fluids under pressure.

Finally, yet a further, fifth preferred embodiment is illustrated in FIG. 7 for a relief system 130 in relief mode for a process system 132 having a pair of upstream conduits 134 and 136, each having a relief valve 146 and 148, respectively. A pair of sensing lines 138 and 140 communicate with a pair of buckling pin actuators 142 and 144. Both relief valves 146 and 148 can be manually or automatically actuated.

Whereas, the present invention has been described in relation to the drawings attached hereto, it should be understood that other and further modifications, apart from those shown or suggested herein, may be made within the spirit and scope of this invention.

What is claimed is:

1. A relief system for process fluids under pressure, which system comprises: a process system under pressure through a pair of upstream conduits in parallel with a pair of normally closed isolation relief valves, wherein said pair of upstream conduits is in fluid communication with a pair of downstream conduits, wherein said downstream conduits are in fluid communication with a flare;

a pair of buckling pin actuators in downstream fluid communication with a pair of sensing lines, said sensing lines in fluid communication with said process system under pressure through said upstream conduits, wherein said first of said buckling pin actuators is retained in a fused condition and is configured to trip at a predetermined pressure level in said sensing lines;

a pair of spring activated actuators respectively engaged with said isolation relief valve;

a pair of buckling actuator bypass valves respectively engaged with said buckling pin actuators, wherein a first of said buckling actuator bypass valves consisting essentially of a buckling actuator bypass three-way bypass valve supplied with non process fluid pressure to an input port and having a first output port in fluid communication with an actuator bypass valve and a second output port to a first buckling actuator bypass valve vent, wherein a second of said buckling actuator bypass valves is supplied with non process fluid pressure to an input port and has a first output port in fluid communication with a second of said spring activated actuators and a second output port to a second buckling actuator bypass valve vent;

said actuator bypass valve in downstream fluid communication with said first of said buckling actuator bypass valves and consisting essential of a three-way actuator bypass valve supplied with said non process fluid pressure to an input port and having a first output port in fluid communication with a first of said spring activated actuator and a second output port to an actuator bypass valve vent; and an actuator to move said actuator bypass valve between said first output port in fluid communication with said first of said spring activated actuator and said second output port in communication with an actuator vent whereby pressure in said upstream conduit above a predetermined level will actuate said first of said buckling pin actuators, moving said first of said buckling actuator bypass valve to said second output port and moving said first of said spring activated actuators to open a first of said isolation relief valve or whereby actuation of said actuator, moving said actuator bypass valves to said second output port and moving said first of said spring activated actuators, to open said isolation relief valve;

wherein said first of said buckling pin actuators precedes said first of said buckling actuator bypass valves, wherein said buckling actuator bypass valves is upstream of said actuator bypass valve, wherein said actuator bypass valve is upstream of said spring activated actuators, wherein said first of said buckling actuator bypass valves is positioned intermediate of said first of said buckling pin actuators and said actuator bypass valve, and wherein said actuator bypass valve is positioned intermediate of said first of said buckling actuator bypass valves and said spring activated actuators.

2. A relief system as set forth in claim 1 wherein said process system includes vessels, tanks, containers, and piping.

3. A relief system as set forth in claim 1 wherein said non process fluid to said input port is pressurized atmospheric air, nitrogen gas or hydraulic fluid.

4. A relief system as set forth in claim 1 wherein said actuator to move each of said actuator bypass valves further comprises a manual actuator, an electromechanical actuator, an electric motor actuator, a combined manual/electromechanical actuator, or a combined manual/electric motor actuator.

5. A relief system for process fluids under pressure, which system comprises:
  a process system under pressure through a pair of upstream conduits in parallel with a pair of normally closed isolation relief valves, wherein said pair of upstream conduits is in fluid communication with a pair of downstream conduits, wherein said downstream conduits are in fluid communication with a flare;
  a pair of spring activated actuators respectively engaged with said isolation relief valves;
  a buckling pin actuator in downstream communication with a sensing line, said sensing line in fluid communication with a first of said upstream conduits, wherein said buckling pin actuator is retained in a fused condition and is configured to trip at a predetermined pressure level in said sensing line; and
  a single buckling actuator bypass valve engaged with said buckling pin actuator, wherein said buckling actuator bypass valve is supplied with non process fluid pressure to an input port and has a first output port in direct fluid communication with an actuator bypass valve and a second of said spring activated actuators and has a second output port to a buckling actuator bypass valve vent, wherein buckling pin actuator operates to move said buckling actuator bypass valve between a vent position and an activated position;
  said actuator bypass valve in downstream fluid communication with said buckling actuator bypass valve and consisting essential of a three-way actuator bypass valve supplied with said non process fluid pressure to an input port and having a first output port in fluid communication with first of said spring activated actuators and a second output port to an actuator bypass valve vent; and
  an actuator to move said actuator bypass valve between said first output port in fluid communication with said first of said spring activated actuators and said second output port in communication with an actuator vent whereby pressure in at least one of said upstream conduits above a predetermined level will actuate said buckling pin actuator, moving said buckling actuator bypass valve to said second output port and moving said first of said spring activated actuators to open a first of said isolation relief valves or whereby actuation of said actuator, moving said actuator bypass valve to said second output port and moving said first of said spring activated actuators to open said isolation relief valve;
  wherein said buckling pin actuator precedes said buckling actuator bypass valve, wherein said buckling actuator bypass valve is upstream of said actuator bypass valve, wherein said actuator bypass valve is upstream of said first of said spring activated actuators, wherein said buckling actuator bypass valve is positioned intermediate of said buckling pin actuator and said actuator bypass valve, and wherein said actuator bypass valve is fluidly positioned intermediate of said buckling actuator bypass valve and said first of said spring activated actuators.

6. A relief system as set forth in claim 5 wherein said process system includes vessels, tanks, containers, and piping.

7. A relief system as set forth in claim 5 wherein said non process fluid to said input port is pressurized atmospheric air, nitrogen gas or hydraulic fluid.

8. A system relief valve as set forth in claim 5 wherein said actuator to move said actuator bypass valve further comprises a manual actuator, an electromechanical actuator, an electric motor, a combined manual/electromechanical actuator, or a combined manual/electric motor actuator.

\* \* \* \* \*